United States Patent [19]
Leman

[11] Patent Number: 6,161,944
[45] Date of Patent: Dec. 19, 2000

[54] RETRACTABLE KEYBOARD ILLUMINATION DEVICE

[75] Inventor: Michael V. Leman, Eagle, Id.

[73] Assignee: Micron Electronics, Inc., Nampa, Id.

[21] Appl. No.: 09/313,812

[22] Filed: May 18, 1999

[51] Int. Cl.$^7$ .................................................. G09G 5/00
[52] U.S. Cl. .................... 362/276; 362/802; 362/253; 362/287; 345/168; 345/170
[58] Field of Search ..................... 362/253, 154, 362/155, 802, 276, 318, 287; 345/168, 170

[56] References Cited

U.S. PATENT DOCUMENTS

| | | | |
|---|---|---|---|
| 5,379,201 | 1/1995 | Friedman | 362/191 |
| 5,684,513 | 11/1997 | Decker | 345/168 |
| 5,793,358 | 8/1998 | Petkovic | 345/168 |
| 6,020,878 | 2/2000 | Robinson | 345/173 |
| 6,040,822 | 3/2000 | Decker | 345/168 |

*Primary Examiner*—Thomas M. Sember
*Attorney, Agent, or Firm*—Trop, Pruner & Hu, P.C.

[57] ABSTRACT

A computer system may include a retractable illumination device to illuminate a keyboard in a dimly lit environment. The illumination device may be located proximal to the keyboard or on a display. The illumination device may be activated by raising it to a position above the keyboard or by exposing the device via a slideable cover. The illumination device may be deactivated by retracting it into the computer system or covering it with the slideable cover.

19 Claims, 5 Drawing Sheets

RETRACTABLE KEYBOARD ILLUMINATION DEVICE

BACKGROUND

The invention relates generally to computer keyboards, and more particularly, to computer keyboards with illumination features.

As laptop computer systems have become more popular and more portable, computer users now operate their computers in many different locations. Many times the computer user may desire to operate their computer in an environment with insufficient lighting such as an airplane, bus, or dimly lit room. The lack of adequate lighting may hinder the user's view of the keys on the keyboard and may affect the user's ability to work efficiently. The user may attempt to remedy this problem by using lamps or other external lighting. However, external light sources necessitate more space and are frequently unavailable in the environment in which the user chooses to operate the computer. Thus, it would be beneficial to provide improved keyboard illumination.

SUMMARY

In one embodiment, the invention includes a laptop computer having a base unit with a keyboard. A retractable illumination device may be located on the base unit to illuminate the keyboard. The illumination device may be raised up from the base unit and retracted into the base unit. In another embodiment, the retractable illumination device may be located on the display unit to illuminate the keyboard.

DETAILED DESCRIPTION

Figure 1:
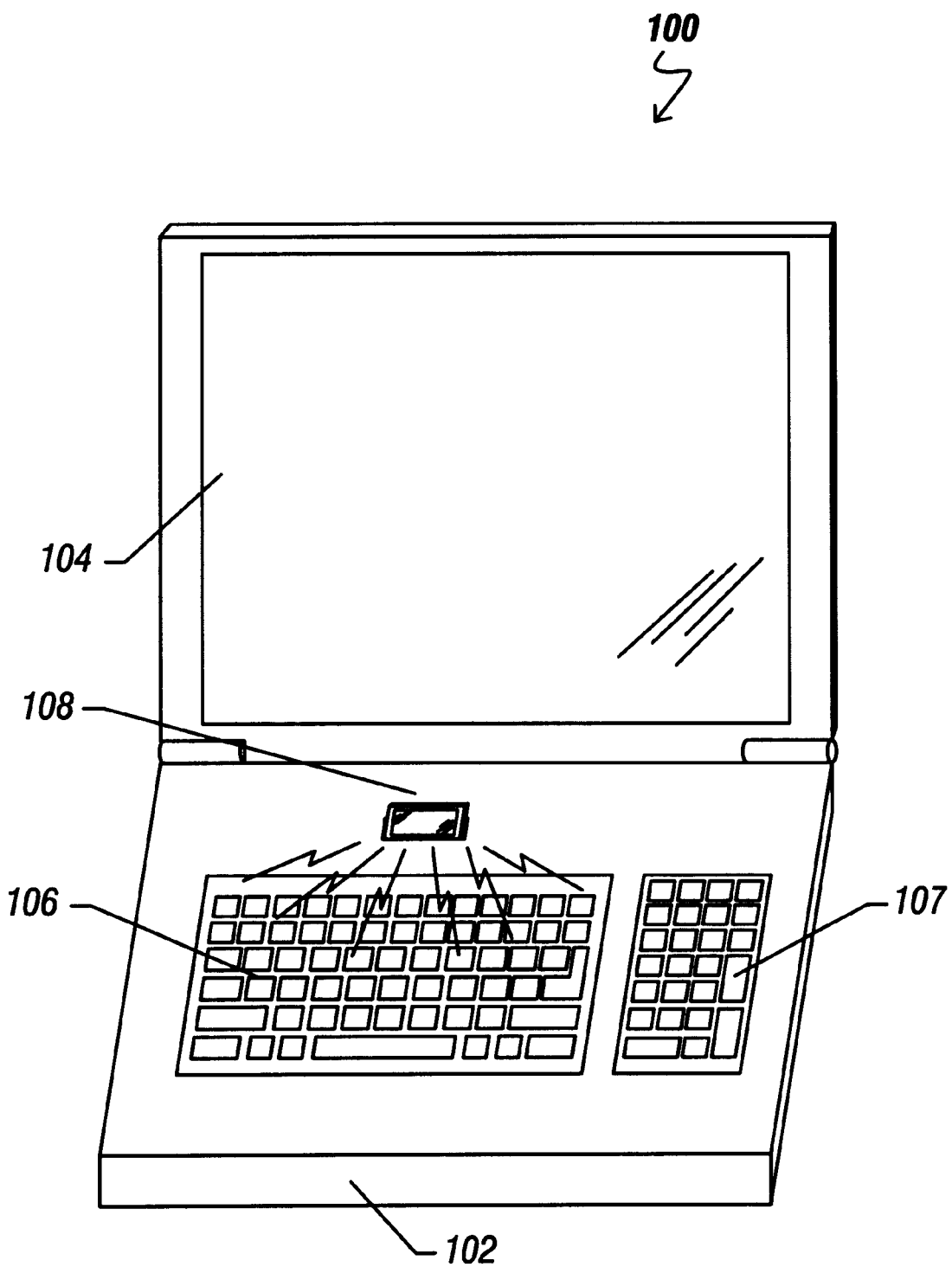
FIG. 1 shows a laptop computer having a retractable illumination device in accordance with one embodiment of the invention.

Referring to FIG. 1, an illustrative laptop computer 100 may include a base unit 102 having a processor, system memory, and a long term storage device (e.g., magnetic or optical disk units). The laptop computer 100 may also include a display 104 and a keyboard 106. The keyboard 106 allows user input to the laptop computer 100 and may reside on the top surface of the base unit 102. Additionally, the base unit 102 may include function keys 107 which may be located to the right or left of the keyboard 106. The laptop computer 100 may also include a retractable illumination device 108 to illuminate the keyboard 106 and enable the operation of the laptop computer 100 in a dimly lit environment. The illumination device 108 may be any conventional type of illumination device such as an incandescent light or a light emitting diode (LED). In another embodiment, the illumination device 108 may be a grain of wheat LED to provide greater luminous intensity. Also, the illumination device 108 may be located at the back and center of the base unit 102. Alternatively, the illumination device 108 may be located on either side of the keyboard 106 on the base unit 102. A second retractable illumination device may be included to further illuminate the keyboard. In another embodiment, an illumination device 108 may be located on an outer surface of the display 104 and may be positioned to illuminate the keyboard 106.

Figure 2:
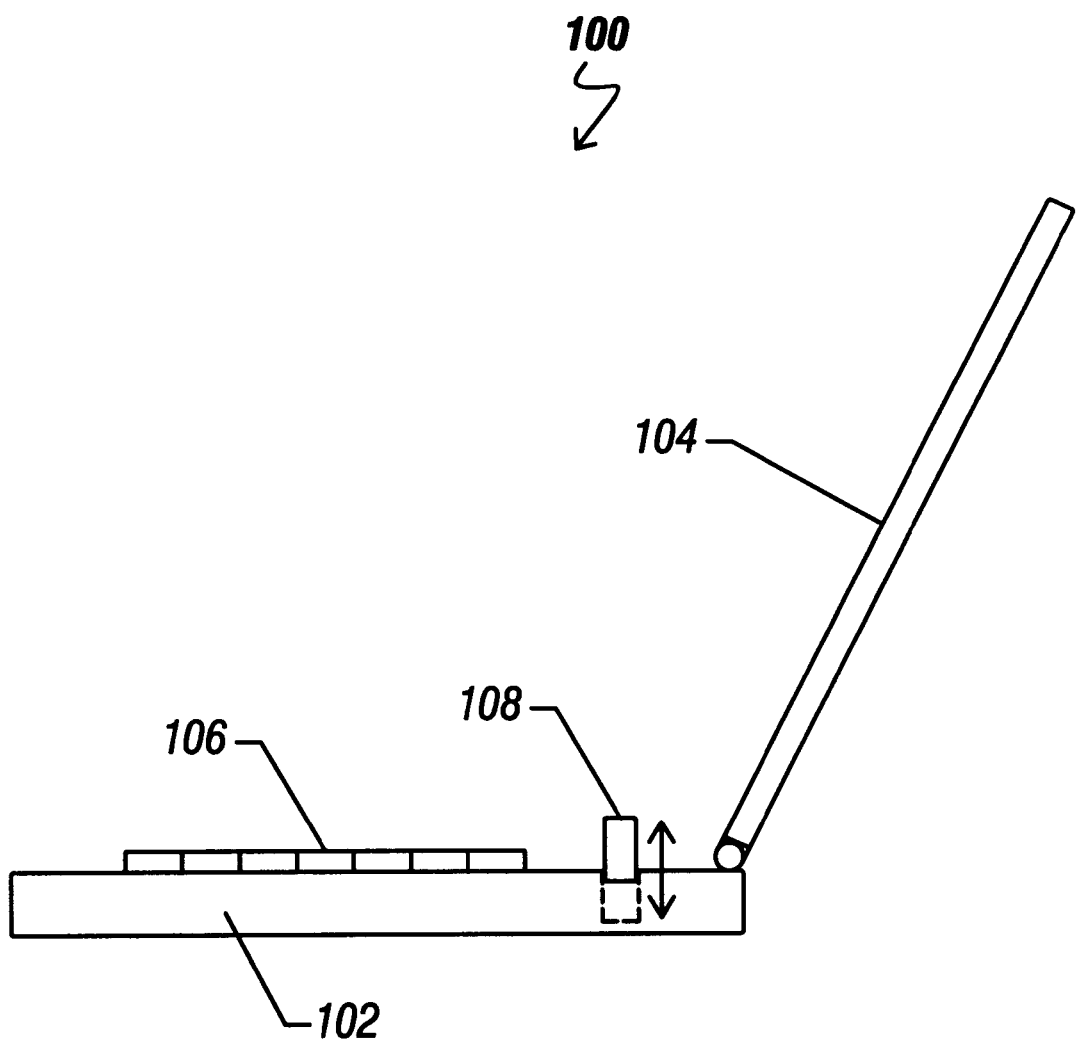
FIG. 2 shows a side view of a laptop computer having a retractable illumination device in accordance with one embodiment of the invention.

As shown in FIG. 2, the illumination device 108 may be a pop-up device. In an active or extended state, device 108 may be raised above the surface of the base unit 102 to illuminate the keyboard 106. In an inactive or retracted state, device 108 may be recessed into the base unit 102. In one embodiment, the illumination device 108 may be popped up by pressing on the top of the device 108. The act of popping up the illumination device 108 may also activate the device 108 to illuminate the keyboard 106. The acts of raising and retracting the illumination device 108 may be controlled by any appropriate type of mechanism such as a spring loaded device. In another embodiment, an electronic device may be employed to control the raising and retracting movements of the device 108. Additionally, the illumination device 108 may include a cover or a lens to diffuse and/or direct the light to provide better illumination of the keyboard 104. Also, power for the illumination device 108 may be supplied by the same source that provides power for the base unit 102.

Figure 3:
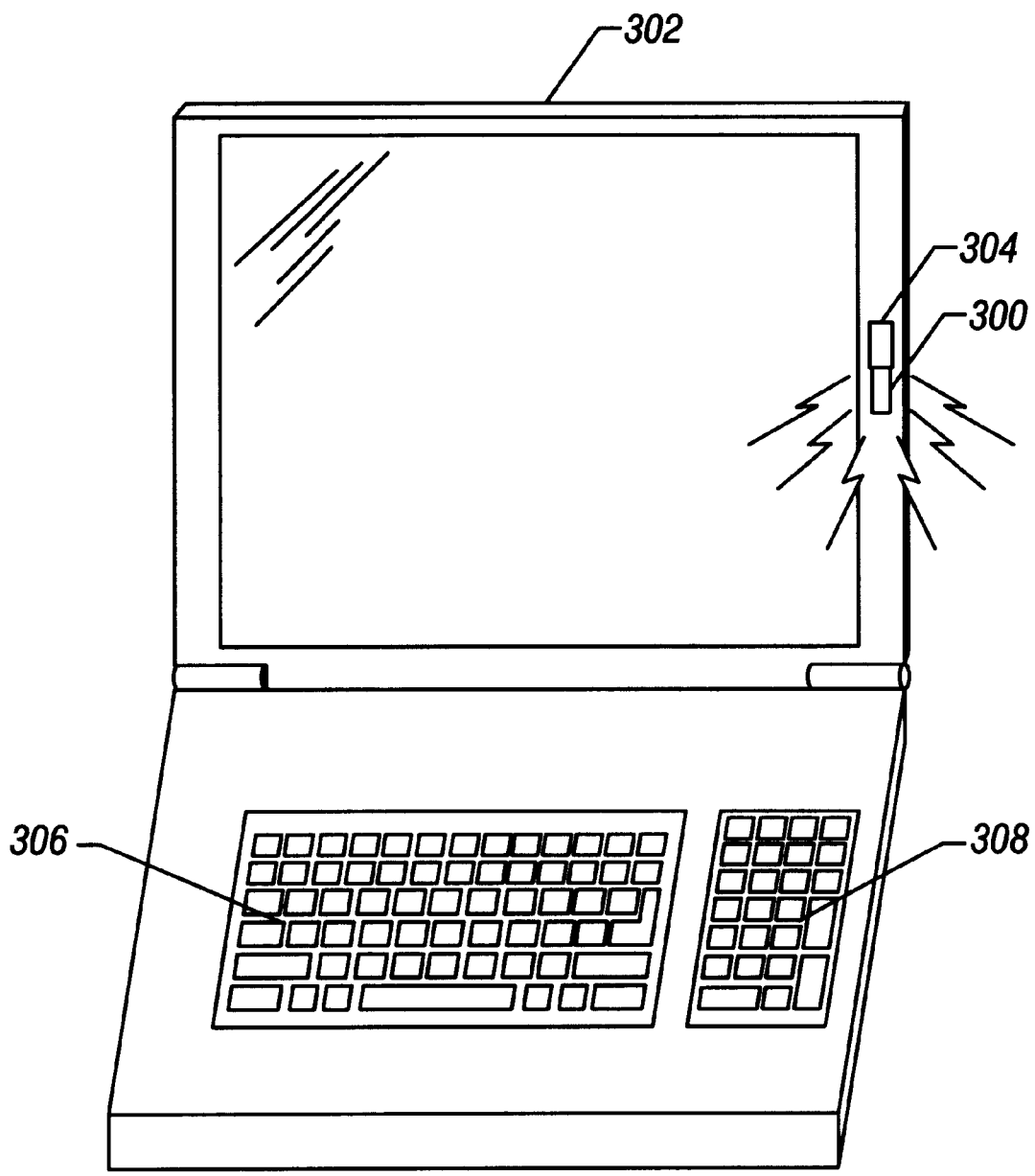
FIG. 3 shows a laptop computer having an illumination device with a slideable cover in accordance with another embodiment of the invention.

Referring to FIG. 3, in accordance with another embodiment of the invention, an illumination device 300 may be incorporated into the display unit 302. The illumination device 300 may be a pop-up device as described above, or it may be permanently fixed to an outer surface of the display unit 302. Additionally, the illumination device 300 may include a slideable cover 304. To expose and activate the illumination device 300, the slideable cover 304 may be slid back allowing the device 300 to illuminate a keyboard 306 and function keys 308. When illumination is not necessary, the siideable cover 304 may be slid over the illumination device 300 to substantially cover and deactivate the device 300.

Figure 4:
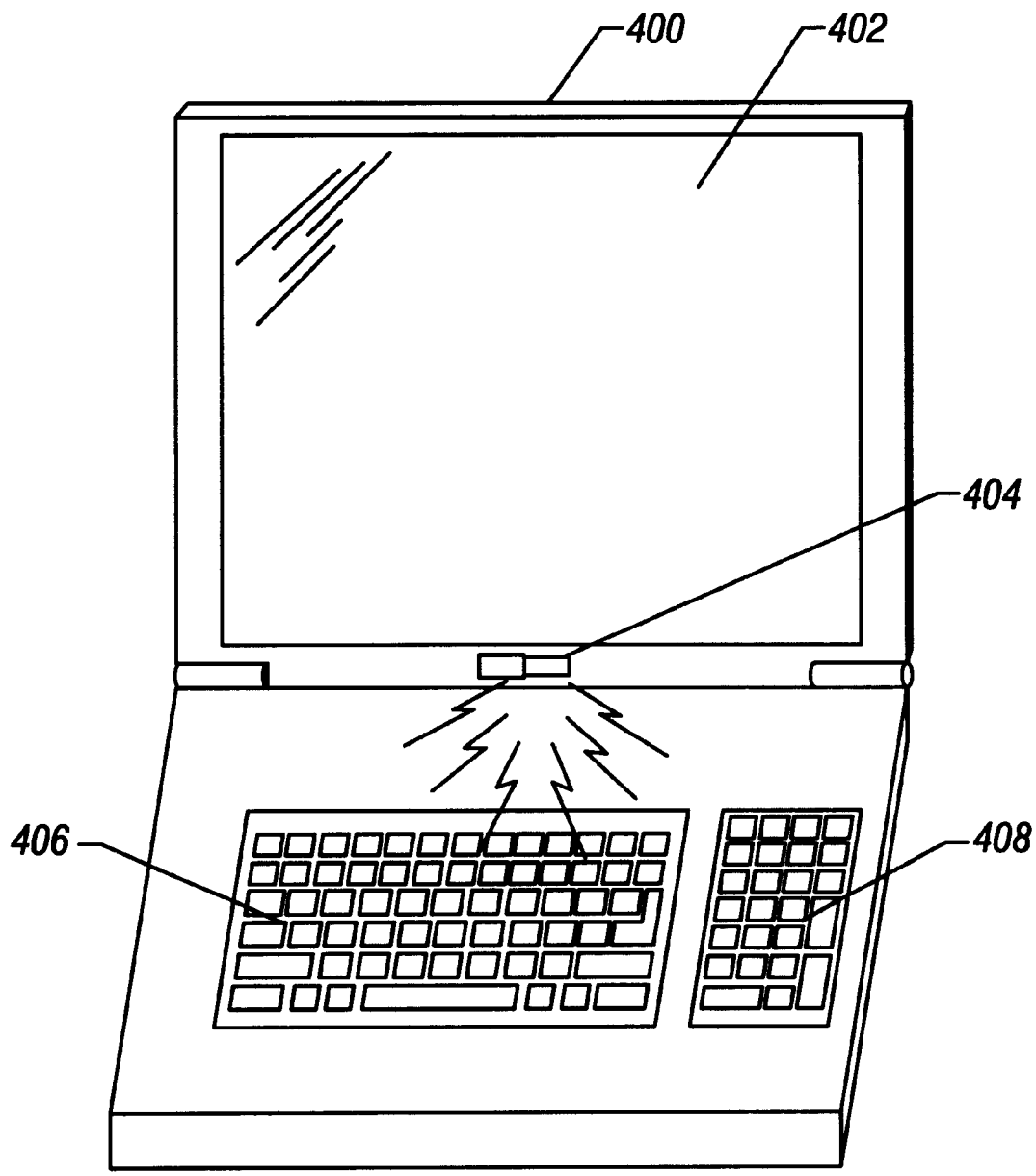
FIG. 4 shows a laptop computer having an illumination mechanism with a slideable cover in accordance with yet another embodiment of the invention.

In accordance with yet another embodiment shown in FIG. 4, a display unit 400 may include a liquid crystal display 402 and a light source (not shown) to illuminate the display. The light source may be a conventional backlight for laptop computers and may include one or more light elements to illuminate the liquid crystal display 402. The display unit 400 may also include an illumination mechanism 404 that utilizes light emitted by the light source to illuminate a keyboard 406 and function keys 408. In this embodiment, light pipes or other light conducting elements may be used to direct a portion of the light generated by the light source to the illumination mechanism 404. The illumination mechanism may employ a lens to focus the light on the keyboard 406 and function keys 408. The illumination mechanism may be selectively activated and deactivated by a switch. Alternatively, a slideable cover may be included to deactivate the illumination mechanism 404 by substantially covering the mechanism 404.

Figure 5:
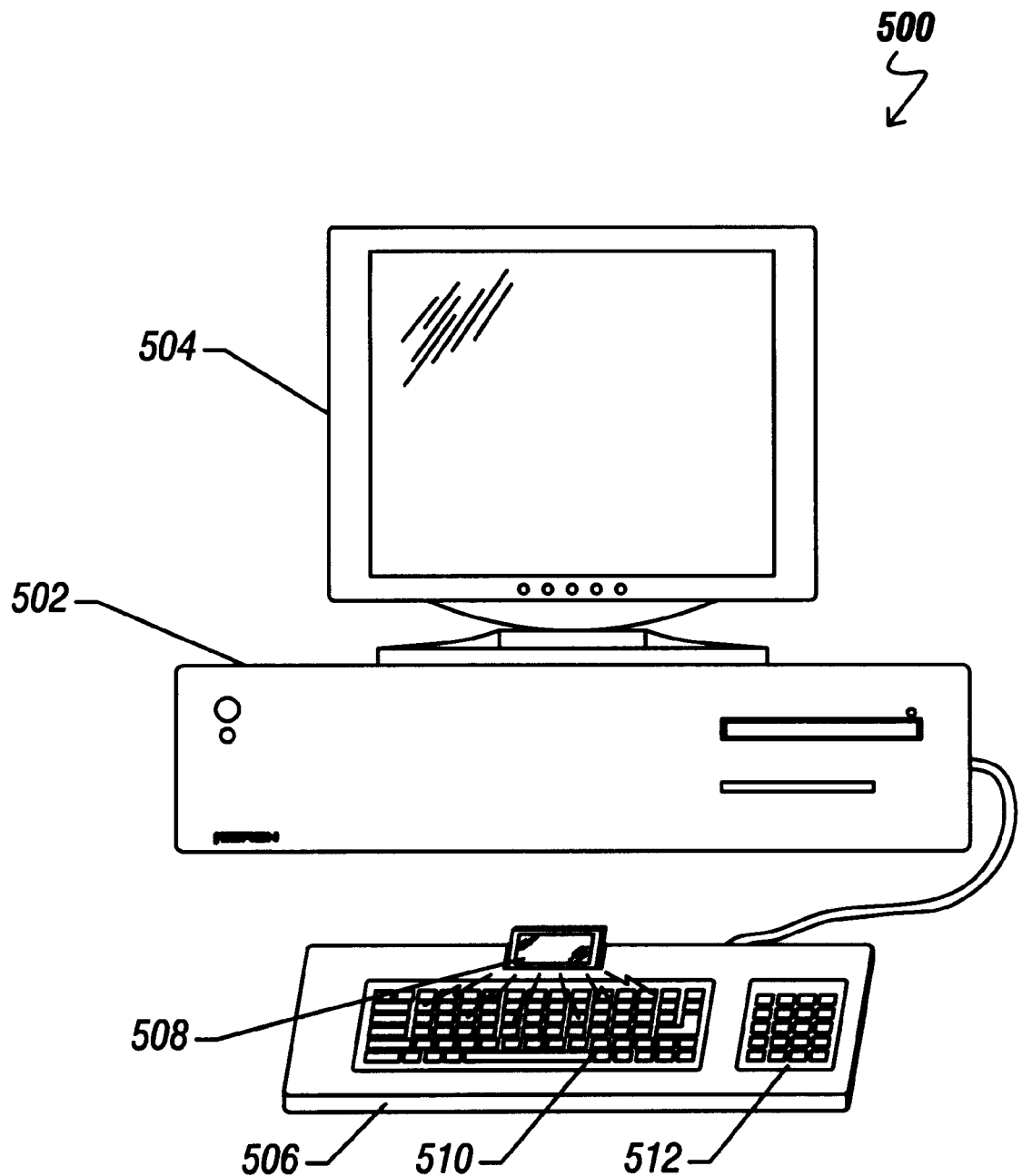
FIG. 5 shows a computer system having a retractable illumination device in accordance with another embodiment of the invention.

In accordance with still another embodiment of the invention, a retractable illumination device may be used in a computer workstation. Referring to FIG. 5, an illustrative computer system 500 in accordance with one embodiment of the invention may include a desk or floor unit 502 having a microprocessor, system memory, and a long term storage device (e.g., magnetic or optical disk units). The computer system 500 may also include a monitor 504 to display output and a keyboard 506 to allow user input. Additionally, the computer system 500 may include a retractable illumination device 508 to illuminate both character keys 510 and function keys 512 of the keyboard 506. The illumination device 508 may be raised up from and retracted into the chassis of the keyboard in the same manner as described for the laptop computer 500.

A computer user may gain significant benefits from an illumination device in accordance with the invention. First, the user may operate their computer regardless of the lighting of the environment in which the user is located. The retractable illumination device may illuminate the keys of the keyboard such that the user may work efficiently in a dimly lit environment. When the user is in an environment with adequate external lighting, the illumination device on the base unit or keyboard may be retracted. Additionally, the illumination device should not obstruct normal operation of the computer system because of the location and retractable feature of the device.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A laptop computer comprising:
 a base unit having a top surface;
 a display unit coupled to the base unit;
 a keyboard coupled to the top surface of the base unit; and
 an illumination device coupled to the base unit having a first position associated with an inactive state of the illumination device and a second position associated with an active state of the illumination device, wherein the illumination device is separate from the display unit and the keyboard.

2. The laptop computer of claim 1, wherein the first position comprises a retracted position in which a top surface of the illumination device is substantially flush with the top surface of the base unit.

3. The laptop computer of claim 1, wherein the second position comprises a raised position in which a top surface of the illumination device is above the top surface of the base unit.

4. The laptop computer of claim 1, wherein the illumination device further comprises a lens element.

5. A laptop computer comprising:
 a base unit having a top surface;
 a keyboard coupled to the top surface of the base unit;
 a display unit coupled to the base unit, the display unit comprising a display member; and
 an illumination device coupled to the display unit having a first position associated with an inactive state of the illumination device and a second position associated with an active state of the illumination device, wherein the illumination device is separate from the display member and the keyboard.

6. The laptop computer of claim 5, wherein the first position comprises a retracted position in which a top surface of the illumination device is substantially flush with the outer surface of the display unit, and the second position comprises a raised position in which the top surface of the illumination device is above the outer surface of the display unit.

7. The laptop computer of claim 5, further comprising a slideable cover coupled to the illumination device, wherein the first position corresponds to the slideable cover substantially covering the illumination device, and the second position corresponds to the slideable cover substantially exposing the illumination device.

8. The laptop computer of claim 5, wherein the illumination device further comprises a lens element.

9. A laptop computer comprising:
 a base unit having a keyboard member;
 a display unit, coupled to the base unit, having a display member;
 a light source coupled to the display unit, the light source adapted to generate light, a first portion of said light to illuminate the display member; and
 an illumination mechanism coupled to the display unit, the illumination mechanism adapted to illuminate a portion of the keyboard member using a second portion of said light, wherein the illumination mechanism is separate from the display member and the keyboard member.

10. The laptop computer system of claim 9, wherein the display member comprises a liquid crystal display (LCD) and the light source comprises a backlight source.

11. The laptop computer system of claim 10, wherein the backlight source comprises at least one light element.

12. The laptop computer system of claim 9, wherein the illumination mechanism may be selectively activated and deactivated by a switch.

13. The laptop computer system of claim 9, wherein the illumination mechanism may be selectively activated and deactivated by a slideable cover.

14. A keyboard module comprising:
 a keyboard chassis having a top surface;
 a plurality of keys coupled to the keyboard chassis; and
 an illumination device having a light source and coupled to the keyboard chassis, the illumination device having a first position associated with an inactive state and a second position associated with an active state.

15. The keyboard module of claim 14, wherein the first position comprises a retracted position in which a top surface of the illumination device is substantially flush with the top surface of the keyboard chassis.

16. The keyboard module of claim 14, wherein the second position comprises a raised position in which a top surface of the illumination device is above the top surface of the keyboard chassis.

17. The keyboard module of claim 14, wherein the illumination device further comprises a lens element.

18. A laptop computer comprising:
 a base unit having a top surface;
 a keyboard coupled to the top surface of the base unit;
 a display unit coupled to the base unit, the display unit having an outer surface;
 an illumination device coupled to the display unit having a first position associated with an inactive state of the illumination device and a second position associated with an active state of the illumination device; and
 a slideable cover coupled to the illumination device, wherein the first position corresponds to the slideable cover substantially covering the illumination device, and the second position corresponds to the slideable cover substantially exposing the illumination device.

19. A laptop computer comprising:

a base unit having a keyboard member;

a display unit, coupled to the base unit, having a display member;

a light source coupled to the display unit, the light source adapted to generate light, a first portion of said light to illuminate the display member; and an illumination mechanism coupled to the display unit, the illumination mechanism adapted to illuminate a portion of the keyboard member using a second portion of said light, and wherein the illumination mechanism may be selectively activated and deactivated by a slideable cover.

* * * * *